United States Patent [19]

Coughlin et al.

[11] Patent Number: 5,789,489

[45] Date of Patent: Aug. 4, 1998

[54] FAST-CURING PERFLUOROELASTOMER COMPOSITION

[75] Inventors: Michael Cregg Coughlin; Charles David Monaco, both of Wilmington, Del.

[73] Assignee: E. I. du Pont de Nemours and Company, Wilmington, Del.

[21] Appl. No.: 908,762

[22] Filed: Aug. 8, 1997

Related U.S. Application Data

[63] Continuation of Ser. No. 755,919, Nov. 25, 1996.

[60] Provisional application No. 60/007,836 Dec. 1, 1995.

[51] Int. Cl.$^6$ .................................................. C08F 8/00
[52] U.S. Cl. ................................... 525/370; 525/326.3
[58] Field of Search ............................ 525/370, 326.3

[56] References Cited

U.S. PATENT DOCUMENTS

| | | | |
|---|---|---|---|
| 3,085,083 | 4/1963 | Schreyer | 260/87.5 |
| 3,956,000 | 5/1976 | Kuhls et al. | 106/270 |
| 4,281,092 | 7/1981 | Breazeale | 526/247 |
| 4,394,489 | 7/1983 | Aufdermarsh | 525/370 |
| 4,525,539 | 6/1985 | Feiring | 525/326.3 |
| 4,529,784 | 7/1985 | Finlay | 526/247 |
| 4,713,418 | 12/1987 | Logothetis et al. | 525/200 |
| 4,879,362 | 11/1989 | Morgan | 526/247 |
| 4,983,680 | 1/1991 | Ojakaar | 525/281 |
| 5,051,479 | 9/1991 | Logothetis et al. | 525/197 |
| 5,260,351 | 11/1993 | Logothetis | 522/152 |
| 5,439,896 | 8/1995 | Ito et al. | |
| 5,447,993 | 9/1995 | Logothetis | 525/273 |
| 5,527,861 | 6/1996 | Logothetis | 525/370 |

FOREIGN PATENT DOCUMENTS

| | | |
|---|---|---|
| 220910 | 5/1987 | European Pat. Off. . |
| 457255 | 11/1991 | European Pat. Off. . |
| 648787 | 4/1995 | European Pat. Off. . |
| WO95/22575 | 8/1995 | WIPO . |
| WO95/28442 | 10/1995 | WIPO . |

OTHER PUBLICATIONS

Logothetis, *Chemistry of Flurocarbon Elastomers*, Prog.Polym.Sci. vol. 14, 251–296, 1989.

*Primary Examiner*—Bernard Lipman
*Attorney, Agent, or Firm*—Marilyn H. Bromels, Esq.

[57] ABSTRACT

Fast curing perfluoroelastomer compositions are provided which comprise a perfluoroelastomer having a plurality of nitrile groups and a plurality of carboxyl-containing groups, carboxylate-containing groups, carboxamide groups, or mixtures thereof; and an organotin curing agent.

25 Claims, No Drawings

1

FAST-CURING PERFLUOROELASTOMER COMPOSITION

CROSS REFERENCE TO RELATED APPLICATIONS

This application is a continuation of U.S. application Ser. No. 08/755,919 filed Nov. 25, 1996, which application claims the benefit of U.S. Provisional Application No. 60/007,836; filed Dec. 1, 1995.

FIELD OF THE INVENTION

This invention relates to curable perfluoroelastomer compositions which exhibit a rapid cure rate and which, when cured, have outstanding thermal stability and chemical resistance.

BACKGROUND OF THE INVENTION

Perfluoroelastomers (elastomeric perfluoropolymers) are polymeric materials which exhibit outstanding high temperature tolerance and chemical resistance. Consequently, such compositions are particularly adapted for use as seals and gaskets in systems in which elevated temperatures and/or corrosive chemicals are encountered. The outstanding properties of perfluoropolymers are largely attributable to the stability and inertness of the copolymerized perfluorinated monomer units which make up the major portion of the polymer backbone, e.g., tetrafluoroethylene and perfluoro(alkyl vinyl) ethers. In order to achieve good elastomeric properties, the perfluoropolymers must be crosslinked. To this end, a small percentage of cure site monomer is copolymerized with the perfluorinated monomer units. Cure site monomers containing nitrile groups, such as perfluoro-8-cyano-5-methyl-3,6-dioxa-1-octene, are especially preferred. Such compositions are described in U.S. Pat. Nos. 4,281,092 and 4,394,489; and in International Application WO 95/22575.

Curing of nitrile-containing perfluoroelastomers may be effected by treatment with organometallic compounds such as tetraphenyltin. However, organotin cures of these compositions have been found to be slow. It would be highly desirable to develop a nitrile-containing perfluoroelastomer composition which cures rapidly and which, when cured, maintains the excellent thermal stability and chemical resistance that is characteristic of perfluoroelastomers. U.S. Pat. No. 5,447,993 discloses a method of rapidly curing nitrile-containing perfluoroelastomers through use of a dual cure system containing both an organotin compound and an organoperoxide. However, methods for enhancing cure rate when organometallic curing agents are used in the absence of peroxides have not heretofore been known.

SUMMARY OF THE INVENTION

The present invention provides a curable perfluoroelastomer composition comprising (A) a perfluoroelastomer comprising copolymerized units of
(1) a perfluoroolefin; (2) a perfluorovinyl ether selected from the group consisting of perfluoro(alkyl vinyl) ethers, perfluoro(alkoxy vinyl) ethers, and mixtures thereof, and (3) a cure site monomer having at least one nitrile group, selected from the group consisting of fluorinated olefins having at least one nitrile group, fluorinated vinyl ethers having at least one nitrile group, and mixtures thereof; wherein the perfluoroelastomer is characterized by i) having a plurality of carbonyl-containing endgroups selected from the group consisting of carboxyl endgroups, carboxylate endgroups, carboxamide endgroups, and mixtures thereof and ii) being substantially free of ionizable or ionized endgroups other than those having carbonyl-containing functional groups; and wherein the integrated absorbance ratio of the carbonyl-containing endgroups is greater than 0.1, the integrated absorbance ratio being determined by calculating the ratio of the integrated peak intensity within the range of 1620–1840 cm$^{-1}$ to that within the range of 2220–2740 cm$^{-1}$, as measured on a Fourier transform infrared spectrum of the perfluoroelastomer; and (B) about 0.1 to about 10 parts by weight per hundred parts by weight perfluoroelastomer of an organotin curing agent wherein the perfluoroelastomer composition is characterized by having a t$_s$2 of less than 4 minutes, when measured with a moving die rheometer at a moving die frequency of 1.66 Hertz, using an oscillation amplitude of ±0.5 degrees at 199° C.

The invention is further directed to a curable perfluoroelastomer composition comprising (A) a perfluoroelastomer having a plurality of carbonyl-containing functional groups selected from the group consisting of carboxyl groups, carboxylate groups, and carboxamide groups, said perfluoroelastomer comprising copolymerized units of (1) a perfluoroolefin; (2) a perfluorovinyl ether selected from the group consisting of perfluoro(alkyl vinyl) ether, perfluoro(alkoxy vinyl) ethers, and mixtures thereof; (3) a fluorinated comonomer selected from the group consisting of carboxyl-containing and carboxylate-containing comonomers, and (4) a cure site monomer having at least one nitrile group, selected from the group consisting of fluorinated olefins having nitrile groups, fluorinated vinyl ethers having at least one nitrile group and mixtures thereof wherein the integrated absorbance ratio of the carbonyl-containing functional groups is greater than 0.1, the absorbance ratio being determined by calculating the ratio of the integrated peak intensity within the range of 1620–1840 cm$^{-1}$ to that within the range of 2220–2740 cm$^{-1}$, as measured on a Fourier transform infrared spectrum of the perfluoroelastomer; and (B) about 0.1 to about 10 parts by weight per hundred parts by weight perfluoroelastomer of an organotin curing agent wherein the perfluoroelastomer composition is characterized by having a t$_s$2 of less than 4 minutes, when measured with a moving die rheometer at a moving die frequency of 1.66 Hertz, using an oscillation amplitude of ±0.5 degrees at 199° C.

In addition, the invention is directed to a process for preparation of a perfluoroelastomer which comprises copolymerizing a mixture of a) a perfluoroolefin monomer; b) a perfluorovinyl ether monomer selected from the group consisting of perfluoro(alkyl vinyl) ethers, perfluoro(alkoxy vinyl) ethers, and mixtures thereof; and c) a cure site monomer having at least one nitrile group, selected from the group consisting of fluorinated olefins having at least one nitrile group, fluorinated vinyl ethers having at least one nitrile group, and mixtures thereof; at a pressure of from 4–10 MPa, in the presence of a persulfate free radical initiator, wherein i) the feed ratio of monomer to initiator is controlled so that the ratio of the radical flux to the polymerization rate, $R_f/R_p$, is from about 10 to 50 millimoles per kilogram, and ii) wherein no more than 5 mole percent sulfite or bisulfite reducing agent, based on millimoles of persulfate initator, is present in the monomer mixture.

DETAILED DESCRIPTION OF THE INVENTION

The fast curing compositions of the present invention comprise two components: a perfluoroelastomer and an organometallic compound. The perfluoroelastomer is characterized by having carbonyl-containing functional groups. By carbonyl-containing functional groups is meant carboxyl groups, carboxylate groups, carboxamide groups, or mixtures thereof. For purposes of this invention, carbonyl-containing functional groups do not include esters, aldehydes, or ketones. In addition, the perfluoroelastomer also contains a plurality of nitrile groups. The organometallic compound is an organotin curing agent.

By fast curing it is meant that when the two-component composition, or a mixture of the two-component composition with conventional additives used in rubber compounding, is tested using a moving disk rheometer at a temperature of 199° C., under conditions such that the moving die frequency is 1.66 Hertz and the oscillation amplitude is ±0.5 degrees, the value of $t_s2$ (i.e. the time in minutes to a rise of 2.26 dNm torque above the minimum torque value) is less than 4 minutes.

Perfluoroelastomers are generally cured (i.e. crosslinked) in compression molding processes which involve a primary curing step and a post curing step. The primary cure step consists of heating a mixture of the perfluoroelastomer, a curing agent, and optional additives in a mold at elevated temperature, to produce a partially cured molded part. The partially cured part is then removed from the mold and subsequently post-cured at elevated temperature. Cure time in the mold must be long enough to permit development of sufficient crosslink density in the polymer to enable the partially-cured composition to recover its shape after removal from the mold and retain its shape in the period prior to and during post-cure. Notwithstanding these restrictions, in order to be economically feasible the primary cure reaction should generally take place in less than 20 minutes. Rapid onset of cure at the primary cure temperature is also desirable. The compositions of the present invention exhibit these cure characteristics. In addition, the cured perfluoroelastomer vulcanizates have outstanding thermal stability and chemical resistance.

The major component of the compositions of the present invention is the fluoropolymer, which is selected from a specific class of nitrile-containing perfluoroelastomers. The class consists of elastomeric fluoropolymers composed of copolymerized units of at least two principal perfluorinated monomers, the fluoropolymer further containing copolymerized units of at least one cure site monomer. Generally, one of the principal comonomers is a perfluoroolefin while the other is a perfluorovinyl ether. Representative perfluorinated olefins include tetrafluoroethylene and hexafluoropropylene. Suitable perfluorinated vinyl ethers are those of the formula

$$CF_2=CFO(R_fO)_n(R_{f'}O)_mR_{f'} \qquad (I)$$

where $R_f$ and $R_{f'}$ are different linear or branched perfluoroalkylene groups of 2–6 carbon atoms, m and n are independently 0–10, and $R_{f'}$ is a perfluoroalkyl group of 1–6 carbon atoms.

A preferred class of perfluoro(alkyl vinyl) ethers includes compositions of the formula

$$CF_2=CFO(CF_2CFXO)_nR_f \qquad (II)$$

where X is F or $CF_3$, n is 0–5, and $R_f$ is a perfluoroalkyl group of 1–6 carbon atoms.

Most preferred perfluoro(alkyl vinyl) ethers are those wherein n is 0 or 1 and $R_f$ contains 1–3 carbon atoms. Examples of such perfluorinated ethers include perfluoro (methyl vinyl) ether and perfluoro(propyl vinyl) ether. Other useful monomers include compounds of the formula

$$CF_2=CFO[(CF_2)_mCF_2CFZO]_nR_f \qquad (III)$$

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1. Additional perfluoro(alkyl vinyl) ether monomers include compounds of the formula

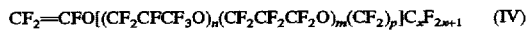

$$CF_2=CFO[(CF_2CFCF_3O)_n(CF_2CF_2CF_2O)_m(CF_2)_p]C_xF_{2x+1} \qquad (IV)$$

where m and n=1–10, p=0–3, and x=1–5.

Preferred members of this class include compounds where n=0–1, m=0–1, and x=1. Examples of useful perfluoro (alkoxy vinyl) ethers include

$$CF_2=CFOCF_2CF(CF_3)O(CF_2O)_mC_nF_{2n+1} \qquad (V)$$

where n=1–5, m=1–3 and where, preferably, n=1.

Mixtures of perfluoro(alkyl vinyl) ethers and perfluoro (alkoxy vinyl) ethers may also be used.

Preferred copolymers are composed of tetrafluoroethylene and at least one perfluoro(alkyl vinyl) ether as principal monomer units. In such copolymers, the copolymerized perfluorinated ether units constitute from about 15–50 mole percent of total monomer units in the polymer.

Small quantities of copolymerized cure site monomers are also present in the perfluoroelastomer component of the invention, generally, in amounts of from 0.1–5 mole percent. Preferably, the range will be between 0.4–1.5 mole percent. Although more than one type of cure site monomer may be present, generally one cure site monomer is used and it contains at least one nitrile substituent group. Suitable cure site monomers are selected from the group consisting of fluorinated olefins and fluorinated vinyl ethers which contain at least one nitrile (i.e. cyano) group. Useful cyano-substituted cure site monomers include those of the formulas shown below.

$$CF_2=CF-O(CF_2)_n-CN \qquad (VI)$$

where n=2–12, preferably 2–6;

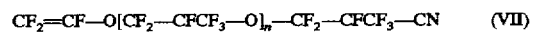

$$CF_2=CF-O[CF_2-CFCF_3-O]_n-CF_2-CFCF_3-CN \qquad (VII)$$

where n=0–4, preferably 0–2; and

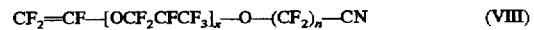

$$CF_2=CF-[OCF_2CFCF_3]_x-O-(CF_2)_n-CN \qquad (VIII)$$

where x=1–2, and n=1–4.

Those of formula (VIII) are preferred. Especially preferred cure site monomers are perfluorinated polyethers having a nitrile group and a trifluorovinyl ether group. A most preferred cure site monomer is

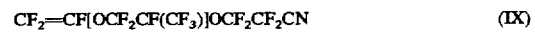

$$CF_2=CF[OCF_2CF(CF_3)]OCF_2CF_2CN \qquad (IX)$$

i.e. perfluoro(8-cyano-5-methyl-3,6-dioxa-1-octene), or 8-CNVE.

An especially preferred perfluoroelastomer contains 53.0–79.9 mole percent tetrafluoroethylene, 20.0–46.9 mole percent perfluoro(methyl vinyl) ether and 0.4 to 1.5 mole percent nitrile-containing cure site monomer.

The perfluoroelastomers suitable for use in the curable compositions of the present invention are characterized by having carboxyl groups, carboxylate groups, or carboxamide groups present along the polymer chain. These carbonyl-containing groups may be present as endgroups introduced during the polymerization, but they may also be present as a result of copolymerization of fluorinated carbonyl-containing comonomers. By carbonyl-containing comonomer is meant a fluorinated monomer having a copolymerizable double bond and at least one pendant carboxylic acid group (including salts thereof), pendant carboxylic acid ester group, or pendant carboxamide group. Such comonomers are represented by compounds represented by formulas (X) and (XI):

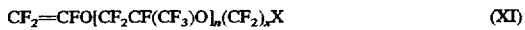

where n=1–4, x=2–5, and $X=CO_2H$, $CO_2^-$, $CONH_2$, or $CO_2CH_3$

Depending on the carbonyl-containing comonomer selected, the resulting polymer would have carboxyl, carboxylate, or carboxamide (i.e. carboxylic acid amide) groups at any point on the chain, i.e. at the chain end, within the chain, or both.

Carboxyl or carboxylate endgroups can be generated by carrying out the polymerization at temperatures of 75° C.–90° C. while utilizing a persulfate initiator in the absence of substantial amounts of sulfite or bisulfite reducing agent. By substantial amounts is meant no more than 5 mole percent, based on millimoles of persulfate initiator added. The persulfate initiator may be the ammonium, sodium, or potassium salt. The ammonium salt is preferred. Carboxyl or carboxylate endgroups result from hydrolysis of polymer endgroups produced through persulfate initiation. For example, hydrolyzed polymer ends exist as carboxylate salts of the metals and other cations present in the polymerization mixture. Cations arise from a number of sources, including the persulfate initiator itself, the surfactant, and buffer used to control the pH of the polymerization emulsion.

A particular feature of the perfluoroelastomers suitable for use in the invention is that they are substantially free of ionized or ionizable endgroups other than carboxyl endgroups or carboxylate endgroups. By substantially free is meant that no more than 0.75 millimoles per kilogram of polymer of these other ionizable or ionized endgroups are present. Examples of such other ionized or ionizable groups include sulfonic acid or sulfonate endgroups. If these non-carboxyl or non-carboxylate groups are present in significant quantity, then the viscosity of the polymer begins to increase, which makes polymer processing difficult. In general, the perfluoroelastomers will contain carboxyl endgroups or carboxylate endgroups. Carboxamide endgroups can arise from the hydrolysis of initiator-derived endgroups in the presence of ammonium ion or free ammonia.

The perfluoroelastomers can be prepared by polymerization of appropriate monomer mixtures in the presence of a free radical generating initiator either in bulk, in solution in an inert solvent, in aqueous suspension, or in aqueous emulsion. Perfluoroelastomer polymerization techniques are described in Logothetis, Prog. Polymn. Sci, Vol. 14, 252–296 (1989). Such polymerizations are usually carried out in an aqueous medium by feeding monomers under pressure into a stirred reactor and initiating the polymerization with a persulfate initiator in the presence of a sulfite or bisulfite reducing agent, such as sodium sulfite. This type of initiation is referred to as redox initiation and results in production of polymer compositions having sulfonate endgroups. The Logothetis article further discloses that polymerization may be initiated by persulfates, such as ammonium or potassium persulfate, in the absence of a sulfite or bisulfite reducing agent. Thermally initiated free-radical polymerization using persulfates in the absence of a sulfite or bisulfite reducing agent results in the production of polymers having carboxylic acid endgroups which ionize to form carboxylate groups.

A preferred method of producing the perfluoroelastomer component of the present invention involves initiation of the copolymerization reaction with ammonium persulfate, in the absence of a sulfite or bisulfite reducing agent, in aqueous emulsion in a continuous well-stirred reactor with a residence time of 2–4 hours, at a temperature of 75° C.–90° C. and at a pressure of 2–8 MPa. Preferably the residence time is between 3.0–3.7 hours, the temperature is 80° C.–85° C., and the pressure is 6–8 MPa. Reducing agents include such compounds as sodium sulfite and sodium hydrogen sulfite. If levels of sulfite or bisulfite reducing agent above 5 mole percent, based on ammonium persulfate, are present, then the amount of sulfonate endgroups reaches a level which has detrimental effects on processability. In addition, in order to obtain the fast cure rates typical of the compositions of the present invention, the pH of the polymerization reaction is (generally between 3.5–7.0, preferably between 4.5–6.5. Tetrafluoroethylene and perfluoro(methyl vinyl) ether are preferred monomers and are fed by compressor. Nitrile-containing cure site monomer is preferably fed by liquid metering pump. This polymerization method results in production of a nitrile-containing copolymer having a plurality of nitrile groups and a significant proportion of carboxyl endgroups, carboxylate endgroups, carboxamide endgroups, or mixtures thereof.

It has been found that the rapid cure rate which characterizes the curable nitrile-containing perfluoroelastomer compositions of this invention is dependent on the carbonyl content of the polymer component. The number of carboxyl, carboxylate, and carboxamide groups present in the nitrile-containing perfluoroelastomers accounts for the carbonyl content and is related to the ratio of radicals generated to polymerization rate. Specifically, the ratio of the radical generation rate, calculated from persulfate thermal decomposition kinetics, to the polymerization rate, provides a measure of the carbonyl content of the polymer. Thermal decomposition rates for persulfate are correlated in F. A. Bovey, et al., "Emulsion Polymerization", Interscience Publishers, New York, 1955. At 85° C., the first order decomposition rate coefficient is 0.011 /minute. For a continuous stirred tank reactor at 85° C. and a residence time of 218 minutes, about 70% of persulfate fed would decompose to produce a radical flux $R_i$ (mmol/hour), of sulfate radicals equal to 1.4 times the persulfalte fed (mmol/hour). Actual initiator efficiency could be significantly less than that assumed in this calculation, depending on polymer conditions and type of monomer involved. The polymerization rate $R_p$, (kg/hour) is readily measured, so that the ratio $R_i/R_p$ can be calculated for correlation with the observed carboxylate levels. Generally, for purposes of the present invention, the ratio $R_i/R_p$ should be in the range of about 10–50 mmol/kg, preferably 20–40 mmol/kg. A preferred process for preparation of a perfluoroelastomer comprises copolymerizing a perfluoroolefin monomer, a perfluoro(alkyl vinyl) ether monomer, and a cure site monomer in the presence of a persulfate free radical initiator, wherein essentially no sulfite or bisulfite reducing agent is present, at a pressure of from 4–10 MPa, most preferably 6.0–8.0 wherein the feed ratio of monomer to initiator is controlled so that the ratio of the rate of radicals generated to the polymerization rate, $R_r/R_p$, is from about 15 to 50 mmol/kg.

It is surprising to find that a polymer with a greater number of endgroups, that is, a lower molecular weight, has a faster curing response than that of a higher molecular weight compound. However, this is what is found for the perfluoroelastomer component of the present invention when cured in the presence of organotin curatives.

A potential problem exists for polymer compositions of the present invention wherein the perfluoroelastomeric component has carboxyl or carboxylate endgroups. The viscosity of these polymers is higher than that of polymers of the same molecular weight having no ionizable carboxyl endgroups, or carboxylate endgroups. Certain end-use applications require low viscosity polymers having high flow characteristics. This problem can be remedied by conversion of the perfluoropolymers to lower viscosity analogues by heating to a temperature sufficiently high, and for a sufficiently long period of time to decarboxylate a portion of the endgroups and convert them to nonionizable substituents, for example difluoromethyl groups, trifluorovinyl groups, or carboxamide groups. This results in a lowering of polymer bulk viscosity. Generally, a temperature of 250° C.–325° C., for a period of several minutes to several hours, is sufficient. Such polymers and processes for their preparation are disclosed in co-pending U.S. patent application Ser. No. 08/755,946, filed Nov. 25, 1996.

The perfluoroelastomers must contain a sufficient quantity of nitrile functional groups which can act as cure sites for crosslinking reactions. Usually, the nitrile groups are introduced by use of a nitrile-containing cure site monomer, i. e., the nitrile groups are introduced into the polymer during polymerization. However, other methods of introduction are also contemplated by the invention.

The carbonyl content of the perfluoroelastomer may be determined by an integrated absorbance ratio method based on Fourier transform infrared analysis. Specifically, the total content of carboxyl, carboxylate, and carboxamide groups in the polymer is determined by measuring the integrated carbonyl absorbance (i.e. the total area of all peaks in the region 1620–1840 cm$^{-1}$) of thin polymer films using a Fourier transform IR spectrometer. In order to compare the carbonyl level in different polymer samples, integrated absorbance is normalized for differences in polymer film thickness by taking the ratio of the carbonyl integrated absorbance to the thickness band integrated absorbance. Thickness band integrated absorbance is the total area of all peaks in the region 2200–2740 cm$^{-1}$. The integrated absorbance of peaks in the latter region is proportional to the thickness of the polymer film. The polymers useful in this invention have an integrated absorbance ratio greater than 0.1. The integrated absorbance ratio can be readily used to calculate the concentration of carbonyl groups in the polymer by comparing the integrated absorbance ratio of the polymer to that of a standard polymer of known carboxyl or carboxylate content. Such standards may be prepared from polymers useful in this invention which have been heated in order to completely decarboxylate them, as described in co-pending U.S. patent application Ser. No. 08/755,946, filed Nov. 25, 1996. Known amounts of a carbonyl-containing compound, such as ammonium perfluorooctanoate, may then be added to the substantially completely decarboxylated polymer in order to produce a calibration curve of integrated absorbance ratio versus concentration of ammonium perfluorooctanoate.

A peak height absorbance ratio method may also be used to determine the carboxyl, carboxylate, and carboxamide content of the polymers of the invention. This test relies on Fourier transform infrared peak heights. In particular, the height of the most prominent peaks at approximately 1690 cm$^{-1}$ or 1725 cm$^{-1}$ are measured. These peaks correspond to absorbances attributable to carbonyl moieties present in the polymer. The peak height of the most intense peak within the range of 1690 cm$^{-1}$–1725 cm$^{-1}$ is divided by the peak height at 2350 cm$^{-1}$, which is indicative of the thickness of the sample. This gives the carbonyl absorbance ratio which characterizes the carboxyl, carboxylate, and carboxamide content of the polymer. When this ratio is 0.4 or greater, the polymer responds quickly to cure with organotin curatives. When the ratio is less than about 0.4, the polymers cure slowly. The range generally includes absorbance ratios of 0.2–1.0. The preferred range of the absorbance ratio is 0.4–0.6. The integrated absorbance ratio technique is the more precise analytical method and is therefore preferred.

The nitrile-containing perfluoroelastomers used in the present invention are crosslinked with a cure system based on an organotin compound. Suitable organotin compounds include allyl-, propargyl-, triphenyl- and allenyl tin curatives. Tetraalkyltin compounds or tetraaryltin compounds are preferred curing agents for use in conjunction with nitrile-substituted cure sites. The amount of curing agent employed will necessarily depend on the degree of crosslinking desired in the final product as well as the type and concentration of reactive moieties in the perfluoroelastomer. In general, about 0.5–10 phr (parts per hundred parts rubber) of curing agent can be used, and 1–4 phr is satisfactory for most purposes. It is believed that the nitrile groups trimerize to form s-triazine rings in the presence of curing agents such as organotin compounds, thereby crosslinking the perfluoroelastomer. The crosslinks are thermally stable, even at temperatures of 275° C. and above.

If the polymer component of the compositions of the present invention has been heat-treated in order to partially or completely remove carboxyl endgroups or carboxylate endgroups, then cure with organotin curatives may be unacceptably slow unless an organic or inorganic ammonium salt is added to the composition as an accelerator. Such accelerators include ammonium perfluorooctanoate, ammonium perfluoroacetate, ammonium thiocyanate, and ammonium sulfamate. Such curable compositions are disclosed in copending U.S. patent application, Ser. No. 08/756,310, filed Nov. 25, 1996 U.S. Pat. No. 5,677,389 and are generally used in quantities of 0.1–2.0 parts per hundred parts perfluoroelastomer, preferably in quantities of 0.5–1.0 parts per hundred parts perfluoroelastomer.

Additives, such as carbon black, stabilizers, plasticizers, lubricants, fillers, and processing aids typically utilized in perfluoroelastomer compounding can be incorporated into the compositions of the present invention, provided they have adequate stability for the intended service conditions. In particular, low temperature performance can be enhanced by incorporation of perfluoropolyethers.

Carbon black fillers are used in elastomers as a means to balance modulus, tensile strength, elongation, hardness, abrasion resistance, conductivity, and processability of the compositions. In perfluoroelastomer compositions, small particle size, high surface area carbon blacks have been the fillers of choice. A grade commonly chosen is SAF carbon black, a highly reinforcing black with typical average particle size of about 14 nm and designated N 110 in Group No.

1, according to ASTM D-1765. The particular carbon blacks useful in the compositions of the present invention are those described in WO 95/22575. These particular carbon blacks have average particle sizes of at least about 100 nm to about 500 nm as determined by ASTM D-3849. Examples include MT blacks (medium thermal black) designated N-991, N-990, N-908, and N-907, and large particle size furnace blacks. MT blacks are preferred. When used, 1–70 phr of large size particle black is generally sufficient, and this amount does not retard cure time.

In addition, fluoropolymer fillers may also be present in the composition. Generally from 1 to 50 parts per hundred perfluoroelastomer of a fluoropolymer filler is used, and preferably at least about 5 parts per hundred parts perfluoroelastomer is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

Micropowders that can be used in the composition of the invention include, but are not limited to, those based on the group of polymers known as tetrafluoroethylene (TFE) polymers. This group includes homopolymers of TFE (PTFE) and copolymers of TFE with such small concentrations of at least one copolymerizable modifying monomer that the resins remain non-melt-fabricable (modified PTFE). The modifying monomer can be, for example, hexafluoropropylene (HFP), perfluoro(propyl vinyl) ether (PPVE), perfluorobutyl ethylene, chlorotrifluoroethylene, or another monomer that introduces side groups into the polymer molecule. The concentration of such copolymerized modifiers in the polymer is usually less than 1 mole percent. The PTFE and modified PTFE resins that can be used in this invention include both those derived from suspension polymerization and from emulsion polymerization.

High molecular weight PTFE used in production of micropowder is usually subjected to ionizing radiation to reduce molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE micropowder by appropriate control of molecular weight in the emulsion polymerization process, such as disclosed by Kuhls et al. in U.S. Pat. No. 3,956,000. Morgan, in U.S. Pat. No. 4,879,362, discloses a non-melt-fabricable, non-fibrillating modified PTFE produced by the emulsion (dispersion) polymerization process. This polymer forms platelets on shear blending into elastomeric compositions, instead of fibrillating.

TFE polymers also include melt-fabricable copolymers of TFE having sufficient concentrations of copolymerized units of one or more monomers to reduce the melting point significantly below that of PTFE. Such copolymers generally have melt viscosity in the range of 0.5–60×10³ Pa.s, but viscosities outside this range are known. Perfluoroolefins and perfluoro(alkyl vinyl) ethers are preferred comonomers. Hexafluoropropylene and perfluoro(propyl vinyl) ether are most preferred. Melt fabricable TFE copolymers such as FEP (TFE/hexafluoropropylene copolymer) and PFA [TFE/perfluoro(propyl vinyl)ether copolymer] can be used, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

The curable compositions of the present invention are useful in production of gaskets, tubing, and seals. Such articles are produced by molding a compounded formulation of the curable composition with various additives under pressure, curing the part, and then subjecting it to a post cure cycle. The cured compositions have excellent thermal stability and chemical resistance. They are particularly useful in applications such as seals and gaskets for manufacturing semiconductor devices, and in seals for high temperature automotive uses.

The invention is now illustrated by certain embodiments wherein all parts are by weight unless otherwise specified.

EXAMPLES

TEST METHODS

Cure Characteristics

Cure characteristics were measured using a Monsanto MDR 2000 instrument under the following conditions:

Moving die frequency: 1.66 Hertz
Oscillation amplitude: ±0.50°
Temperature: 199° C.
Sample size: 9 g
Duration: 30 minutes The following cure parameters were recorded:

$M_L$: minimum torque level, in units of dNm $M_H$: maximum torque level, in units of dNm $t_s2$: minutes to 2.26 dNm rise above $M_L$ tc50: minutes to 50% of maximum torque Test specimens were prepared by compounding elastomer with appropriate additives as indicated in the examples below, on a rubber mill or Banbury mixer. The milled composition was formed into a sheet and a 9 g sample was died out into a disk.

A specimen of compounded rubber was placed in a sealed test cavity under a positive pressure and maintained at the elevated test temperature. A biconical disk was embedded in the test specimen and was oscillated through an arc of 0.5° at the specified frequency, thereby to exerting a shear strain on the test specimen. The force at maximum amplitude (torque) required to rotate the disk is proportional to the stiffness (shear modulus) of the rubber. This torque was recorded as a function of time. Because stiffness of a rubber specimen increases during vulcanization, the test provides a measure of curability. A test is completed when the recorded torque either rises to an equilibrium or maximum value, or when a predetermined time has elapsed. The time required to obtain a curve is a function of the test temperature and the characteristics of the rubber compound.

Fourier Transform IR Analyses

Carbonyl content is indicated in the following examples either by the integrated absorbance ratio or peak height absorbance ratio of a Fourier transform IR spectrum of the perfluoroelastomer, using the general methods described hereinabove. Analyses were performed on spectra obtained using a Nicolet 740 Model Fourier transform instrument using SX software.

Example 1

A perfluoroelastomer containing copolymerized units of tetrafluoroethylene, perfluoro(methyl vinyl) ether, and perfluoro-(8-cyano-5-methyl-3,6-dioxa-1-octene) in a molar ratio of approximately 69.4/29.9/0.7 was prepared as follows: An aqueous solution consisting of 20 liters of deionized water, 93 g of ammonium persulfate, 553 g of disodium hydrogen phosphate heptahydrate and 182 g of ammonium perfluorooctanoate (Fluorad® FC-143 fluorinated surfactant) was pumped into a 5 L mechanically stirred, water-jacketed, stainless steel autoclave at a rate of 688 ml/h. At the same time another aqueous solution consisting of 20 liters of deionized water and 177 g of ammonium perfluorooctanoate was also pumped in at a rate of 688 ml/h. A third stream consisting of 24.3 g/h of perfluoro-(8-cyano-5-methyl-3,6-dioxa-1-octene) was metered in simultaneously. By means of a diaphragm compressor a gaseous mixture of tetrafluoroethylene (363 g/h) and perfluoro (methylvinyl) ether (412 g/h) monomer was led in it a constant rate. The temperature of the reactor was maintained at 85° C. and 6.2 MPa (900 psi) pressure throughout the reaction and the pH was controlled at 4.9 The polymer latex was removed continuously by means of a let down valve and unreacted monomers were vented. The latex from 32 hours of operation was collected and the polymer was isolated as follows: 5 liters of the above latex was added with stirring to a preheated (90°–95° C.) solution consisting of 225 g of magnesium sulfate heptahydrate and 40 liters of deionized water. The coagulated crumb polymer which resulted was filtered, washed repeatedly with water, and dried in an air oven at 70° C. for 48 hours. The dried polymer weighed 2280 g and had the following composition, 42.3 wt. % perfluoro(methyl vinyl) ether, 2.4 wt. % perfluoro(8-cyano-5-methyl-3,6-dioxa-1-octene), the remainder being tetrafluoroethylene. The polymer had inherent viscosity of 0.52 dl/g measured in a solution containing 0.1 g of polymer per 100 g of solvent consisting of 60/40/3 volume ratio of heptafluoro-2,2,3-trichlorobutane, perfluoro (butyltetrahydrofuran) and ethylene glycol dimethyl ether. The Mooney viscosity (ML-10) measured at 150° C. was 48. The carbonyl absorbance ratio of the perfluoroelastomer, determined according to the peak height method, was 0.846. This corresponds to an integrated absorbance ratio of much greater than 0.1. The isolated perfluoroelastomer was compounded with the additives listed in Table I using either a two roll rubber mill or a Banbury mixer. The cure characteristics of each compound were determined using a Monsanto MDR 2000 instrument as described in the test methods above.

TABLE I

|  | 1A | 1B | 1C | 1D |
|---|---|---|---|---|
| Formulation (phr) | | | | |
| Example 1 Polymer | 100 | 100 | 100 | 100 |
| Tetraphenyltin | 3 | 3 | 3 | 3 |
| MT Carbon Black | 0 | 5 | 30 | 0 |
| SAF Black | 0 | 0 | 0 | 12 |
| 18-Crown-6 | 0 | 0 | 0 | 0.3 |
| Cure Characteristics | | | | |
| $M_L$ (dNm) | 1.7 | 2.03 | 5.54 | 2.15 |
| $M_H$ (dNm) | 10.17 | 11.53 | 21.92 | 11.53 |
| $t_s2$ (minutes) | 1.82 | 1.65 | 1.53 | 3.95 |
| tc50 (minutes) | 2.57 | 2.45 | 3.12 | 9.78 |

Example 2

A perfluoroelastomer was prepared generally according to the procedure described in Example 1. The copolymerized units of tetrafluoroethylene, perfluoro(methyl vinyl) ether, and perfluoro-(8-cyano-5-methyl-3,6-dioxa-1-octene) in the isolated product were in the mole ratio of approximately 67.8/31.2/.95. The perfluoroelastomer product was compounded in a Banbury mixer with MT carbon black and tetraphenyltin in the ratio 100 phr/30 phr/3 phr. The cure characteristics of the compounded polymer were as follows: $M_L$, 7.34 dNm; $M_H$, 24.07 dNm; $t_s2$, 0.10 minutes; and tc50, 1.17 minutes.

Comparative Example A

A perfluoroelastomer having a mole ratio of copolymerized tetrafluoroethylene, perfluoro(methyl vinyl) ether, and perfluoro-(8-cyano-5-methyl-3,6-dioxa-1-octene) of approximately 69.4/29.9/0.7 was prepared generally according to the procedure described in Example 2 of U.S. Pat. No. 4,281,092. It was prepared in the presence of a persulfate initiator in combination with sodium sulfite, a redox initiator. The polymer was compounded with the additives shown in Table II on a two roll rubber mill and the cure characteristics were determined. Results are shown in Table II.

TABLE II

|  | Sample A1 | Sample A2 |
|---|---|---|
| Formulation (phr) | | |
| Comp. Ex. A Polymer | 100 | 100 |
| SAF Carbon Black | 12 | 0 |
| MT Carbon Black | 0 | 12 |
| Tetraphenyltin | 3 | 3 |
| 18-Crown-6 | 0.3 | 0.3 |
| Cure Characteristics | | |
| $M_L$ (dNm) | 3.73 | 1.7 |
| $M_H$ (dNm) | 10.51 | 6.22 |
| $t_s2$ (minutes) | 8.9 | 14.78 |
| tc50 (minutes) | 13.33 | 14.79 |

Example 3

Three perfluoroelastomers were prepared generally according to the procedure of Example 1, except that the feed ratios of the ammonium persulfate initiator were varied as shown in Table III. The carbonyl contents of the perfluoroelastomers isolated were determined according to Fourier transform infrared analysis. The absorbance ratios determined according to the peak height method are shown in Table III and the $R_i/R_p$ ratios are also reported.

TABLE III

| Sample | Monomer/APS[1] | $R_i/R_p$ | Absorbance Ratio |
|---|---|---|---|
| 3A | 180 | 42.6 | 0.931 |
| 3B | 250 | 31.7 | 0.552 |
| 3C | 350 | 24.1 | 0.435 |

[1]APS is ammonium persulfate.

Example 4

A perfluoroelastomer containing copolymerized units of tetrafluoroethylene, perfluoro(methyl vinyl) ether, and perfluoro-(8-cyano-5-methyl-3,6-dioxa-1-octene) in a molar ratio of 66.5/32.8/0.7 was prepared substantially according to the procedure of Example 1 except that the feed ratio of monomer to ammonium persulfate was 250. The $R_i/R_p$ ratio was 30.9 and the pH of the polymerization mixture was 4.8. The inherent viscosity of the perfluoroelastomer was 0.53 and the integrated absorbance ratio, as determined by Fourier transform IR, was 0.454. Polymer properties are shown in Table IV.

TABLE IV

|  | Sample 4 |
| --- | --- |
| Formulation (phr) | |
| Polymer | 100 |
| MT Carbon Black | 30 |
| Krytox ® 16350 Fluorinated Grease | 10 |
| Tetraphenyltin | 2 |
| 18-Crown-6 | 0.3 |
| Cure Characteristics | |
| $M_L$ (dNm) | 18 |
| $M_H$ (dNm) | 35 |
| $t_s2$ (minutes) | 1.25 |
| tc50 (minutes) | 2.0 |

Example 5

A perfluoroelastomer containing copolymerized units of tetrafluoroethylene, perfluoro(methyl vinyl) ether, and perfluoro-(8-cyano-5-methyl-3,6-dioxa-1-octene) in an approximate molar ratio of 67.3/32.0/0.7 was prepared substantially according to the procedure of Example 1 except that the feed ratio of monomer to ammonium persulfate was 425. The $R_f/R_p$ ratio was 18 and the pH of the polymerization mixture was 6.8. The inherent viscosity of the perfluoroelastomer was 0.69 and the integrated absorbance ratio, as determined by Fourier transform IR, was 0.290. Polymer properties are shown in Table V.

TABLE V

|  | Sample 5 |
| --- | --- |
| Formulation (phr) | |
| Polymer | 100 |
| MT Carbon Black | 30 |
| Krytox ® 16350 Fluorinated Grease | 10 |
| Tetraphenyltin | 2 |
| 18-Crown-6 | 0.3 |
| Cure Characteristics | |
| $M_L$ (dNm) | 12.5 |
| $M_H$ (dNm) | 23 |
| $t_s2$ (minutes) | 3.0 |
| tc50 (minutes) | 9.0 |

We claim:

1. A curable perfluoroelastomer composition comprising
(A) a perfluoroelastomer comprising copolymerized units of (1) a perfluoroolefin; (2) a perfluorovinyl ether selected from the group consisting of perfluoro(alkyl vinyl) ethers, perfluoro(alkoxy vinyl) ethers, and mixtures thereof; and (3) a cure site monomer having at least one nitrile group, selected from the group consisting of fluorinated olefins having at least one nitrile group, fluorinated vinyl ethers having at least one nitrile group, and mixtures thereof; wherein the perfluoroelastomer is characterized by i) having a plurality of carbonyl-containing endgroups selected from the group consisting of carboxyl endgroups, carboxylate endgroups, carboxamide endgroups, and mixtures thereof and ii) being substantially free of ionizable or ionized endgroups other than those having carbonyl-containing functional groups; and wherein the integrated absorbance ratio of the carbonyl-containing endgroups is greater than 0.1, the integrated absorbance ratio being determined by calculating the ratio of the integrated peak intensity within the range of 1620–1840 cm$^{-1}$ to that within the range of 2220–2740 cm$^{-1}$, as measured on a Fourier transform infrared spectrum of the perfluoroelastomer; and (B) about 0.1 to about 10 parts by weight per hundred parts by weight perfluoroelastomer of an organotin curing agent wherein the perfluoroelastomer composition is characterized by having a $t_s2$ of less than 4 minutes, when measured with a moving die rheometer at a moving die frequency of 1.66 Hertz, using an oscillation amplitude of ±0.5 degrees at 199° C.

2. The composition of claim 1 wherein the perfluoroolefin is tetrafluoroethylene.

3. The composition of claim 1 wherein the perfluorovinyl ether is a perfluoro(alkyl vinyl) ether.

4. The composition of claim 1 wherein the perfluorovinyl ether is a perfluoro(alkoxy vinyl) ether.

5. The composition of claim 3 wherein the perfluoro(alkyl vinyl) ether is perfluoro(methyl vinyl) ether.

6. The composition of claim 1 wherein the cure site monomer is a fluorinated olefin having at least one nitrile group.

7. The composition of claim 1 wherein the cure site monomer is a fluorinated vinyl ether having at least one nitrile group.

8. The composition of claim 7 wherein the cure site monomer is a compound of the formula

where x=1–2, and n=1–4.

9. The composition of claim 8 wherein the cure site monomer is $CF_2=CF[OCF_2CF(CF_3)]OCF_2CF_2CN$.

10. The composition of claim 1 wherein the perfluoroolefin is tetrafluoroethylene, the perfluoro(alkyl vinyl) ether is perfluoro(methyl vinyl) ether, and the cure site monomer is perfluoro(8-cyano-5-methyl-3,6-dioxa-1-octene).

11. The composition of any one of the above claims wherein the amount of organotin curing agent is 1–4 parts by weight per hundred parts by weight perfluoroelastomer.

12. The composition of claim 1 which further comprises at least one filler selected from the group consisting of carbon black fillers and fluoropolymer fillers.

13. The composition of claim 12 wherein the fluoropolymer filler is a micropowder.

14. A curable perfluoroelastomer composition comprising
(A) a perfluoroelastomer having a plurality of carbonyl-containing functional groups selected from the group consisting of carboxyl groups, carboxylate groups, and carboxamide groups, said perfluoroelastomer comprising copolymerized units of (1) a perfluoroolefin; (2) a perfluorovinyl ether selected from the group consisting of perfluoro(alkyl vinyl) ethers, perfluoro(alkoxy vinyl) ethers, and mixtures thereof; (3) a fluorinated comonomer selected from the group consisting of carboxyl-containing and carboxylate-containing comonomers, and (4) a cure site monomer having at least one nitrile group, selected from the group consisting of fluorinated olefins having nitrile groups, fluorinated vinyl ethers having at least one nitrile group and mixtures thereof wherein the integrated absorbance ratio of the carbonyl-containing functional groups is greater than 0.1, the absorbance ratio being determined by calculating the ratio of the integrated peak intensity within the range of 1620–1840 cm$^{-1}$ to that within the range of 2220–2740 cm$^{-1}$, as measured on a Fourier transform infrared spectrum of the perfluoroelastomer; and (B) about 0.1 to about 10 parts by weight per hundred parts by weight perfluoroelastomer of an organotin curing agent wherein the perfluoroelastomer composition is characterized by having a t$_c$2 of less than 4 minutes, when measured with a moving die rheometer at a moving die frequency of 1.66 Hertz, using an oscillation amplitude of ±0.5 degrees at 199° C.

15. The composition of claim 14 wherein the perfluoroolefin is tetrafluoroethylene.

16. The composition of claim 14 wherein the perfluorovinyl ether is a perfluoro(alkyl vinyl) ether.

17. The composition of claim 14 wherein the perfluorovinyl ether is a perfluoro(alkoxy vinyl) ether.

18. The composition of claim 16 wherein the perfluoro(alkyl vinyl) ether is perfluoro(methyl vinyl) ether.

19. The composition of claim 14 wherein the cure site monomer is a fluorinated olefin having at least one nitrile group.

20. The composition of claim 14 wherein the cure site monomer is a fluorinated vinyl ether having at least one nitrile group.

21. The composition of claim 20 wherein the cure site monomer is a compound of the formula $$CF_2=CF-[OCF_2CFCF_3]_x-O-(CF_2)_n-CN$$

where x=1–2, and n=1–4.

22. The composition of claim 21 wherein the cure site monomer is $CF_2=CF[OCF_2CF(CF_3)]OCF_2CF_2CN$.

23. The composition of claim 14 wherein the perfluoroolefin is tetrafluoroethylene, the perfluoro(alkyl vinyl) ether is perfluoro(methyl vinyl) ether, and the cure site monomer is perfluoro(8cyano-5-methyl-3,6-dioxa-1-octene).

24. The composition of any one of claims 14–23 wherein the amount of organotin curing agent is 1–4 parts by weight per hundred parts by weight perfluoroelastomer.

25. The composition of claim 24 which further comprises at least one filler selected from the group consisting of carbon black fillers or fluoropolymer fillers.

* * * * *